US008295598B2

(12) United States Patent
Inoue et al.

(10) Patent No.: US 8,295,598 B2
(45) Date of Patent: Oct. 23, 2012

(54) PROCESSING METHOD AND APPARATUS

(75) Inventors: Hirowo Inoue, Kawasaki (JP); Hisashi Ishikawa, Urayasu (JP); Akitoshi Yamada, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 969 days.

(21) Appl. No.: 12/338,265

(22) Filed: Dec. 18, 2008

(65) Prior Publication Data

US 2009/0161954 A1 Jun. 25, 2009

(30) Foreign Application Priority Data

Dec. 20, 2007 (JP) ................................ 2007-329208

(51) Int. Cl.
*G06K 9/34* (2006.01)

(52) U.S. Cl. ...................................................... 382/173

(58) Field of Classification Search ........................ None
See application file for complete search history.

(56) References Cited

U.S. PATENT DOCUMENTS 5,436,981 A 7/1995 Ishikawa ....................... 382/173
5,930,405 A * 7/1999 Chida ........................... 382/284
5,995,669 A 11/1999 Shingu et al. ................. 382/237
6,084,984 A 7/2000 Ishikawa ....................... 382/173
6,191,874 B1 2/2001 Yamada et al. ............... 358/529
6,219,405 B1 4/2001 Inoue ........................... 378/98.8
6,819,794 B2 11/2004 Inoue ............................ 382/169
6,950,559 B2 * 9/2005 Kobayashi .................... 382/260
7,432,985 B2 10/2008 Ishikawa et al. .............. 348/616
7,466,871 B2 * 12/2008 Hosoda et al. ................ 382/266
2001/0028466 A1 * 10/2001 Kobayashi ..................... 358/1.9
2005/0025374 A1 2/2005 Ishikawa ....................... 382/252
2005/0134892 A1 6/2005 Goto et al. ................... 358/1.13
2005/0265622 A1 12/2005 Katsumi
2006/0228035 A1 10/2006 Ishikawa ....................... 382/252
2008/0002766 A1 1/2008 Suwa et al. .............. 375/240.12
2008/0123150 A1 5/2008 Ono et al. .................... 358/3.27
2008/0123163 A1 5/2008 Yamada et al. .............. 358/3.27
2008/0186541 A1 8/2008 Takasaka et al. ............ 358/1.16
2008/0266581 A1 * 10/2008 Ishikawa et al. ............... 358/1.2
2009/0027404 A1 1/2009 Hara et al. .................... 345/506

(Continued)

FOREIGN PATENT DOCUMENTS

JP 8-180177 7/1996

(Continued)

OTHER PUBLICATIONS

Japanese Office Action dated Oct. 31, 2011, in counterpart Japanese Application No. 2007-329208, and English-language translation thereof.

(Continued)

*Primary Examiner* — Samir Ahmed
(74) *Attorney, Agent, or Firm* — Fitzpatrick, Cella, Harper & Scinto

(57) ABSTRACT

A processing apparatus processes input pixel data by referring to pixel data of peripheral pixels. The processing apparatus divides an input image in a first direction, inputs pixel data of a divided image divided in the first direction in a second direction crossing the first direction at a right angle, and stores the inputted pixel data. When a pixel to be referred to for processing the stored pixel data is not included in the divided image, the processing apparatus outputs pixel data of the reference pixel based on the stored pixel data, and processes the stored pixel data by referring to the pixel data of the reference pixel.

16 Claims, 15 Drawing Sheets

U.S. PATENT DOCUMENTS

| | | | | |
|---|---|---|---|---|
| 2009/0034861 | A1 | 2/2009 | Nakagawa et al. | 382/254 |
| 2009/0060390 | A1 | 3/2009 | Hara et al. | 382/303 |
| 2009/0097057 | A1 | 4/2009 | Hosaki et al. | 358/1.15 |

FOREIGN PATENT DOCUMENTS

| | | | |
|---|---|---|---|
| JP | 2000-148969 | A | 5/2000 |
| JP | 2001-251502 | A | 9/2001 |
| JP | 2004-207923 | A | 7/2004 |
| JP | 2005-94212 | A | 4/2005 |
| JP | 2006-333371 | A | 12/2006 |

OTHER PUBLICATIONS

Japanese Office Action dated Feb. 20, 2012, in counterpart Japanese Application No. 2007-329208.

* cited by examiner

PROCESSING METHOD AND APPARATUS

BACKGROUND OF THE INVENTION

1. Field of the Invention

The present invention relates to a processing method and an apparatus for processing input pixel data by referring to pixel data of peripheral pixels.

2. Description of the Related Art

Conventionally, as a method for performing image processing on a large size image with a small capacity memory in an apparatus which lacks a page memory, a band processing method has been proposed. In this band image processing method, upon execution of two-dimensional processing for obtaining an output pixel based on peripheral pixel information, such as expansion/reduction processing or filter processing, pixel data for plural rasters is held in a register and referred to (U.S. Patent Publication No. 2005/265622).

Further, proposed is a filter calculation processing unit, having memories respectively to hold 1 pixel data installed in plural processors, which sequentially performs multiplication and addition of filter factors for pixels using movement among the processors by data shift. This type of filter calculation processing unit as disclosed in Japanese Patent Laid-Open No. 8-180177 performs filter processing without any additional memory. In the filter calculation processing unit having this configuration, a technique of introducing a method for mutual reference to a pixel hold memory in an end processor among the processors, and in liner filter processing, referring to a mirror image at an image end, has been proposed.

However, to maintain image continuity in a so-called band boundary, the boundary between a previously-processed band and a currently-processed band, a region for overlapped reference in the previous and current band regions is required. This causes excessive memory access, that is, re-read processing of such overlap region.

Further, when control is performed to avoid the re-read processing and not to refer to pixels outside a band region to be processed, as re-reading of a reference image region is not performed, it is necessary to ensure a reference region for filter processing within an input image range. As a result, a region reduced in size by outer marginal pixels referred to in filter processing or the like is outputted, and even in simple equal magnification processing, the sizes of the input image and the output image are different.

Further, even when a reference image is re-read, as an image does not exist outside upper/lower/left/right ends of an entire input image, it is necessary to internally generate a reference image and add the reference image to the read image.

Accordingly, when an image to be added is not appropriately generated in consideration of input image, the result of filter processing at the left/right end is not always desirable. For example, when processing to fixedly generate a reference image as a "white" pixel is implemented and an image to be processed is entirely a dark image, an image discontinuity occurs in a portion where a "white" image is abruptly changed to a "black" image in a boundary between a pixel region added as a reference image and a processed pixel region. Accordingly, the result of filter processing or the like is influenced by the discontinuity.

To avoid the above problem, the generation of reference image by using a pixel at an image end has been proposed.

To utilize a pixel at an image end, a reference image may be generated by stretching 1 endmost pixel. Further, as a method for reference image generation appropriate for processing using frequency components such as JPEG method, generation of a reference image by referring to a range of plural pixels at an image end in a mirroring manner has been adopted (U.S. Patent Publication No. 2005/265622 and Japanese Patent Laid-Open No. 8-180177).

However, in the above processing, at for example, an image upper end, it is necessary to install a memory to hold 1 raster or plural raster images so as to hold at least 1 line data inside; or to perform special data flow control for reading data in the same raster position plural times only at the upper end.

Accordingly, a large number of line memories are required, or process control is complicated.

As a novel method for avoiding such an increase in memory capacity, a data processing method (hereinbelow, referred to as a "crossband processing") for processing in a band region while performing not line-based but column-based reading has been proposed. However, in the crossband processing, generation of pixels outside an input image with a small memory capacity has not been proposed.

SUMMARY OF THE INVENTION

The present invention has its object to, in processing of input pixel data by referring to pixel data of peripheral pixels, obtain a high quality output with a small memory capacity.

The present invention provides a processing method for processing input pixel data by referring to pixel data of peripheral pixels, comprising: a division step of dividing an input image in a first direction; an input step of inputting pixel data of a divided image divided in the first direction in a second direction crossing the first direction at a right angle; a storing step of storing the inputted pixel data; an output step of, when a pixel to be referred to for processing the stored pixel data is not included in the divided image, outputting pixel data of a reference pixel based on the stored pixel data; and a process step of processing the stored pixel data by referring to the pixel data of the reference pixel.

Further, the present invention provides a processing apparatus for processing input pixel data by referring to pixel data of peripheral pixels, comprising: division means for dividing an input image in a first direction; input means for inputting pixel data of a divided image divided in the first direction in a second direction crossing the first direction at a right angle; memory means for storing the inputted pixel data; output means for, when a pixel to be referred to for processing the stored pixel data is not included in the divided image, outputting pixel data of a reference pixel based on the stored pixel data; and process means for processing the memorized pixel data by referring to the pixel data of the reference pixel.

Further features of the present invention will become apparent from the following description of exemplary embodiments with reference to the attached drawings.

DESCRIPTION OF THE EMBODIMENTS

Hereinbelow, preferred embodiments of the present invention will be described with reference to the attached drawings.

First Embodiment

Figure 1:
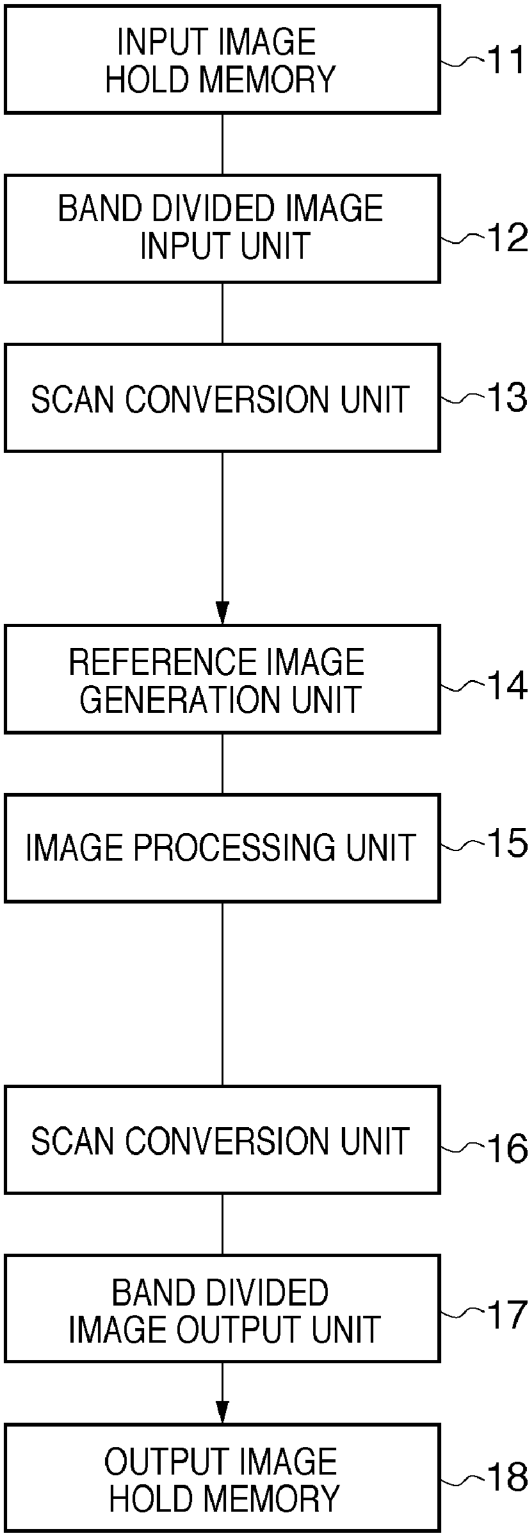
FIG. 1 is a block diagram showing an example of the configuration of an image processing system according to a first embodiment of the present invention.

FIG. 1 is a block diagram showing an example of the configuration of an image data supply apparatus according to a first embodiment.

In FIG. 1, an input image hold memory 11 holds image data to be processed. A band divided image input unit 12 performs read access to an input image stored in the input image hold memory 11 and reads a part of the image cut out in a lateral direction by a band (hereinbelow, referred to as a "band image"). The read band image is held in a band memory (not shown).

A scan conversion unit 13 performs scan conversion by reading pixels of the band image, stored in the band memory by the band divided image input unit 12, in a crossband direction (vertical direction). A reference image generation unit 14 performs processing to generate an upper/lower/left/right reference pixel for the band or page from the scan-converted band image data. That is, the reference image generation unit 14 generates a reference pixel outside a band image region (reference region) necessary for image processing performed by an image processing unit 15 later. That is, the reference image generation unit 14 generates a reference pixel on the periphery of the input image.

The image processing unit 15 performs arbitrary image processing requiring a reference pixel. A scan conversion unit 16 performs scan conversion so as to rearrange the pixel data processed by the image processing unit 15 to data in the initial band data scan direction. A band divided image output unit 17 outputs the band image resulted from the processing by the scan conversion unit 16 to an output image hold memory 18. Note that the output image hold memory 18 may have a band memory for temporary storage of the band image processed by the image processing unit 15.

As an apparatus to input an image and perform processing of a band of an input image, an ink-jet printer or the like can be used. In this case, the input image hold memory 11 is provided on the host apparatus side, and the band divided image input unit 12 inputs a band image from the host apparatus and stores the input band image in a band memory in the ink-jet printer. Accordingly, an image data supply device provided in the ink-jet printer has the units from the band divided image input unit 12 to the output image hold memory 18.

Figure 2:
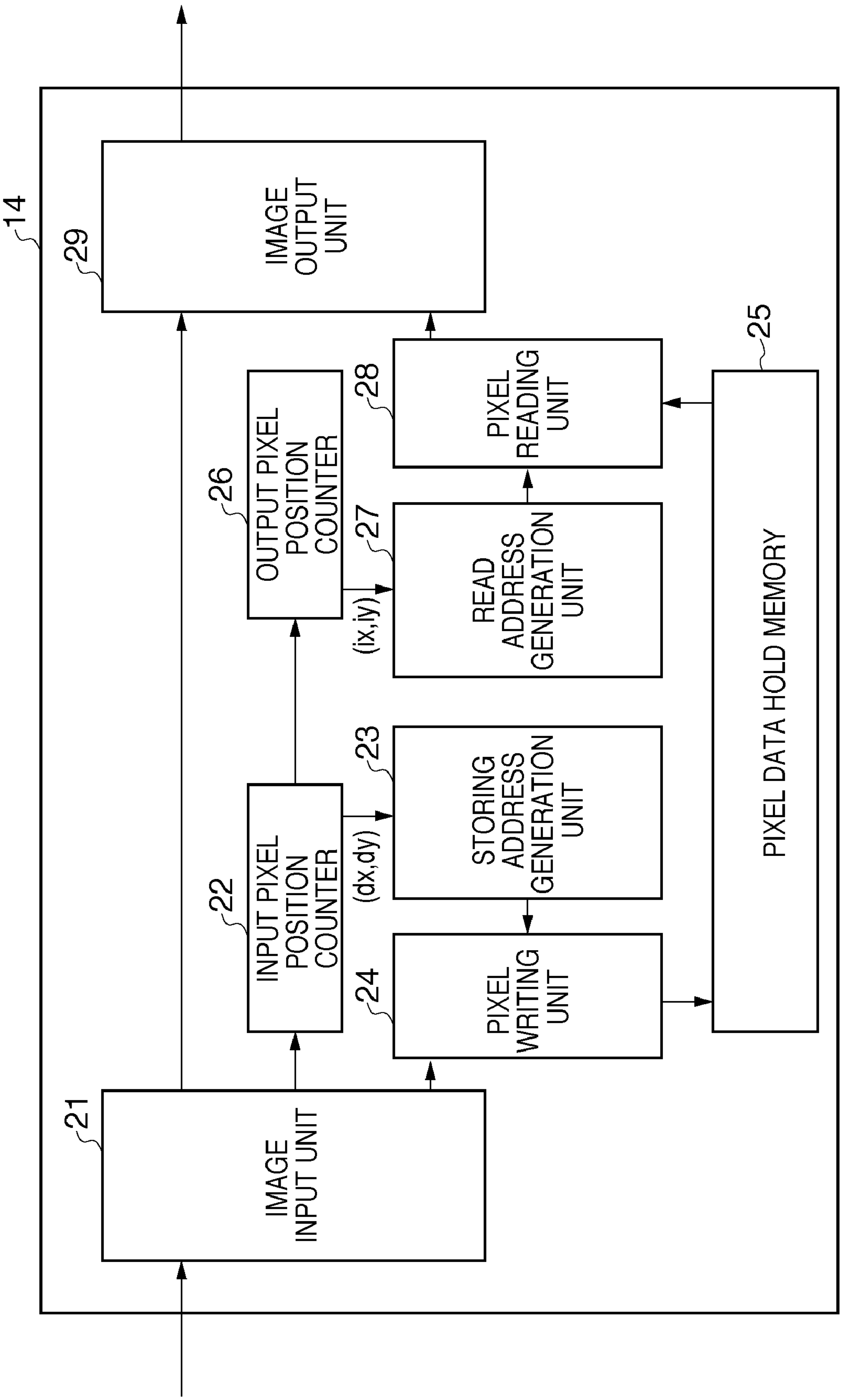
FIG. 2 is a block diagram showing an example of the configuration of a reference image generation unit according to the first embodiment.

FIG. 2 is a block diagram showing a more detailed configuration of the reference image generation unit 14 according to the first embodiment. Hereinbelow, the configuration and the operation of the reference image generation unit 14 according to the first embodiment will be described.

An image input unit 21 receives band image data which has been scan-converted in the crossband direction (vertical direction) and inputted by the pixel from the scan conversion unit 13. When the reference image generation processing is not performed or input data is not to be subjected to the present processing, the image input unit 21 sends the input data directly to an image output unit 29. The image output unit 29 outputs the received data to the next image processing unit 15.

When pixel data is outputted from the image input unit 21, an input pixel position counter 22 counts a pixel position of the outputted pixel data in a main scanning direction (lateral direction) and a subscanning direction (vertical direction) so as to determine the position of the received pixel in a band or a page.

A storing address generation unit 23 calculates a storing address upon storage in a pixel data hold memory 25 in correspondence with the pixel position of the input pixel obtained from the input pixel position counter 22. A pixel writing unit 24 writes the pixel data inputted from the image input unit 21 into the pixel data hold memory 25 in accordance with the storing address calculated by the storing address generation unit 23. That is, the pixel writing unit 24 actually performs write access to the pixel data hold memory 25 installed in the reference image generation unit 14.

The pixel data hold memory 25 holds pixel data in accordance with a write request from the pixel writing unit 24, and outputs pixel data at a designated address in accordance with a read request from a pixel reading unit 28. Thus, a pixel value inputted from the image input unit 21 is written into the pixel data hold memory 25 in accordance with a storing address calculated based on the pixel position in the band image.

An output pixel position counter 26 determines whether or not a pixel necessary for output has been held, in synchronization with a trigger from the input pixel position counter 22. Then, when it is determined that a pixel necessary for output is held, the output pixel position counter 26 counts a pixel position necessary for the image processing unit 15 at the subsequent stage.

A read address generation unit 27 generates an address of the pixel data hold memory 25 at which corresponding data exists, based on the position information from the output pixel position counter 26. The pixel reading unit 28 performs read access to the pixel data hold memory 25 based on the address generated by the read address generation unit 27, thereby reading the pixel data.

The image output unit 29 outputs the pixel outputted from the pixel reading unit 28 to the next pixel processing block. Thus, the pixel value corresponding to the pixel position necessary for the image processing unit 15 at the subsequent stage is read from the pixel data hold memory 25, and is supplied to the image processing unit 15. Note that when pixel data not to be processed in the reference image generation unit 14 is inputted into the image input unit 21, the image output unit 29 selects pixel data sent from the image input unit 21 and outputs the selected data to the image processing unit 15.

Figure 3:
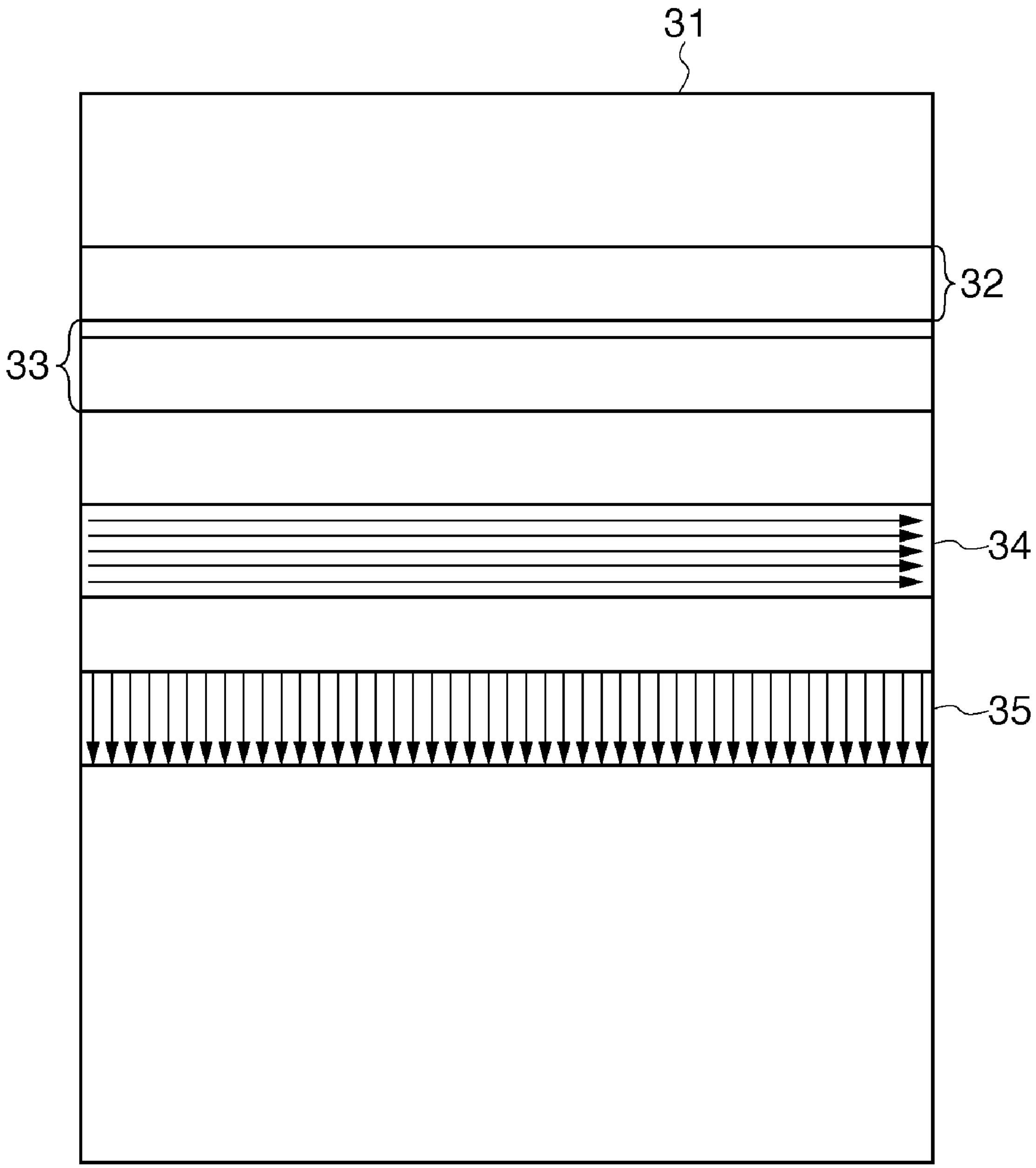
FIG. 3 is an explanatory view of raster scanning method and crossband scanning method in band image processing.

FIG. 3 is an explanatory view showing the outline of band processing on a page image, which the present embodiment is premised on, and data scanning directions in a band. Note that as the scanning directions in the band, general raster scanning and crossband scanning are shown.

In FIG. 3, reference numeral 31 denotes a page image which is an input image as a subject of processing. The page image 31 is held in the input image hold memory 11. In the present embodiment, a method of performing image processing by band image as denoted by numeral 32 or 33, which is a strip-type image obtained by cutting the page image 31 in the lateral direction, as shown in FIG. 3, is employed. At this time, line processing denoted by numeral 34 to sequentially process pixels in the lateral direction of the image called a raster, or crossband processing denoted by numeral 35 to sequentially process pixels in the vertical direction in the band is performed.

FIGS. 4A to 4D are explanatory views showing buffer conditions necessary for performing image processing based on a local two-dimensional pixel group such as filter processing, in the above-described two band processing methods.

Figure 4A:
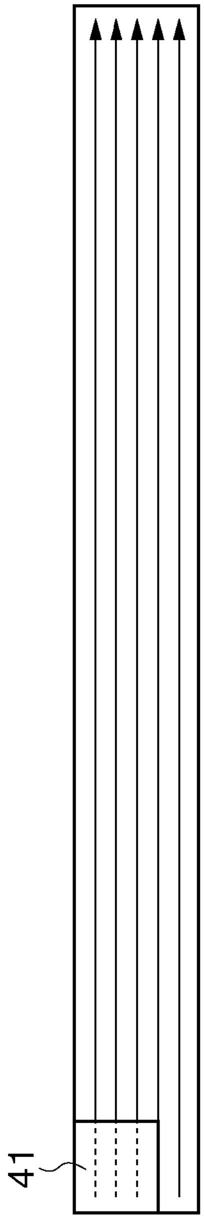
FIGS. 4A to 4D are explanatory views showing the differences by a scanning method in a hold region necessary for processing to refer to peripheral pixels.

FIG. 4A shows a band, obtained by cutting a page image in the lateral direction as described in FIG. 3, on which the line processing is performed to sequentially process pixels in the lateral direction, that is, the line direction.

In the line processing, when two dimensional processing such as filter processing is performed on pixels within a range 41, it is necessary to store pixels in plural lines such that pixels in a previous line can be simultaneously used in a region within the range 41. For example, a pixel in an upper left position in the band is inputted when a first column position in a first line in the band is read, and then, pixels positioned right side are sequentially read. Accordingly, to use the initial pixel with pixels in the next line, it is necessary to hold the initially-input pixel data somewhere until the pixels in the next line are inputted and processing is started. When the image processing requires pixels in more lines, it is necessary to hold all the pixels in further second and third lines.

Figure 4B:
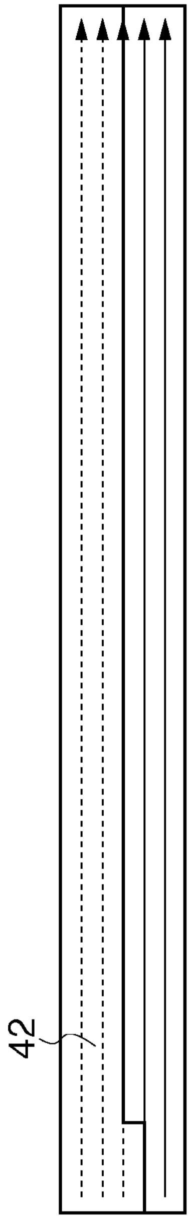

Accordingly, to perform image processing on the region within the range 41, a memory for storage of pixel data within a range 42 as shown in FIG. 4B is actually required.

Figure 4C:
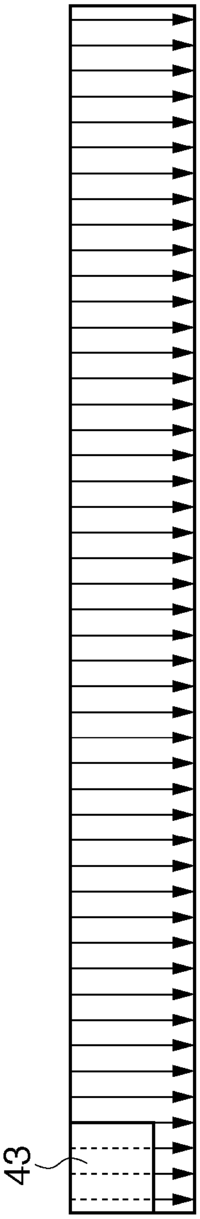
Figure 4D:
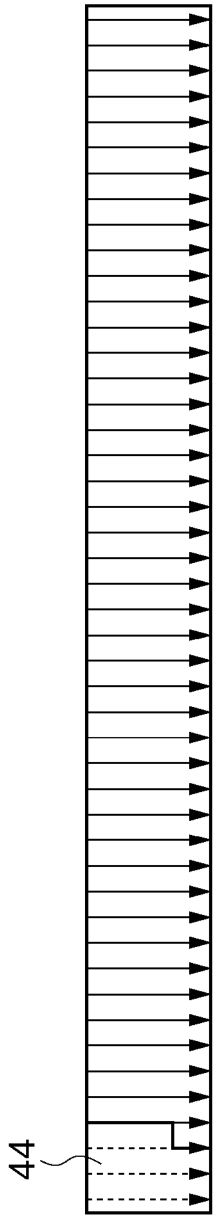

On the other hand, in a processing method as show in FIG. 4C to read pixels in the crossband direction, the processing can be performed with a much smaller pixel hold memory. For example, it is understood that pixels to be held, necessary for two dimensional processing such as filter processing within a range 43, correspond to a range 44 as shown in FIG. 4D in accordance with a pixel reading order.

As described above, in the data processing using the crossband processing, the processing to perform two dimensional processing can be implemented with a very small internal memory.

However, when two dimensional processing is actually performed, since a central 1 pixel is generated using peripheral pixels, pixels outside an image are referred to at upper/lower/left/right ends of the input image when all the pixels in the range of the entire input image are processed. Such reference to the peripheral pixels can be omitted in the two dimensional processing. However, in this case, a pixel region corresponding to a width of peripheral pixels referred to in filter processing or the like is deleted from the input image, and the size of the input image and that of an output image are different. This causes a serious problem upon image processing to continuously perform, for example, filtering with plural different filter coefficients. When the above reference to peripheral pixels is omitted, the image size is reduced by each filtering, and a sufficient effective image range cannot be ensured without difficulty in a final output image.

Figure 5:
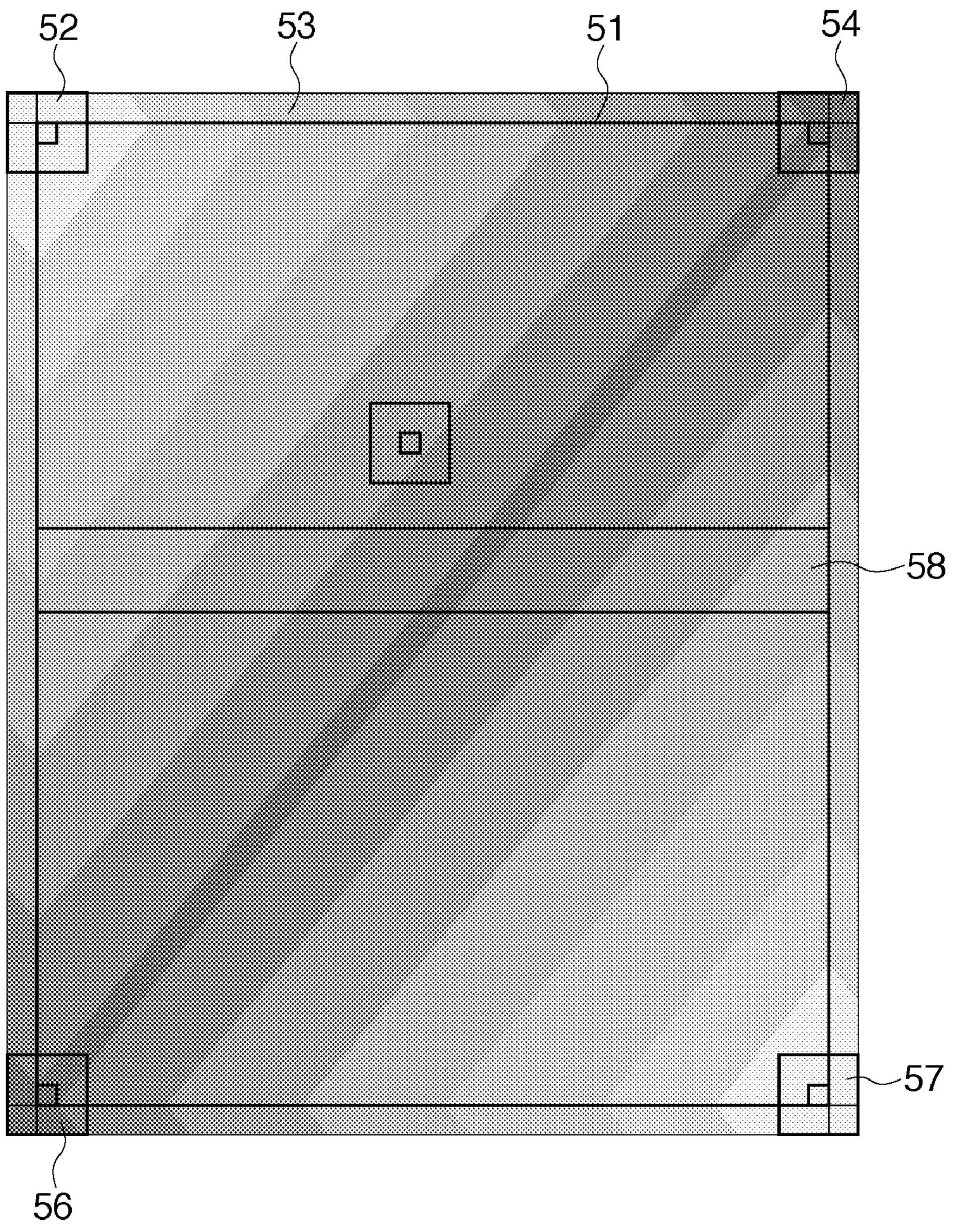
FIG. 5 is an example of a reference image range for a page necessary for processing to refer to peripheral pixels.

Accordingly, as shown in FIG. 5, when filter processing or the like to refer to a range 52 in an input image 51 is performed, processing to complement the input image with a reference image 53 outside the input image is required.

More particularly, in the processing, it is necessary to generate pixels in the range of the image complemented outside the input image, that is, a reference region, so as to surround the upper/lower/left/right and diagonal regions of the page, in consideration of filter processing at the 4 corners of the image as denoted by numerals 52, 54, 56 and 57 in FIG. 5. To recognize the reference image 53 in the reference region positioned with respect to the upper/lower/left/right ends of the page in a band 58, management of the band positions in plural bands, and an algorithm to efficiently perform different reference image generation processings at the upper end, the central part and the lower end, are required. Further, it is necessary to reduce the capacity of a memory inevitably installed in the processing.

Figure 6A:
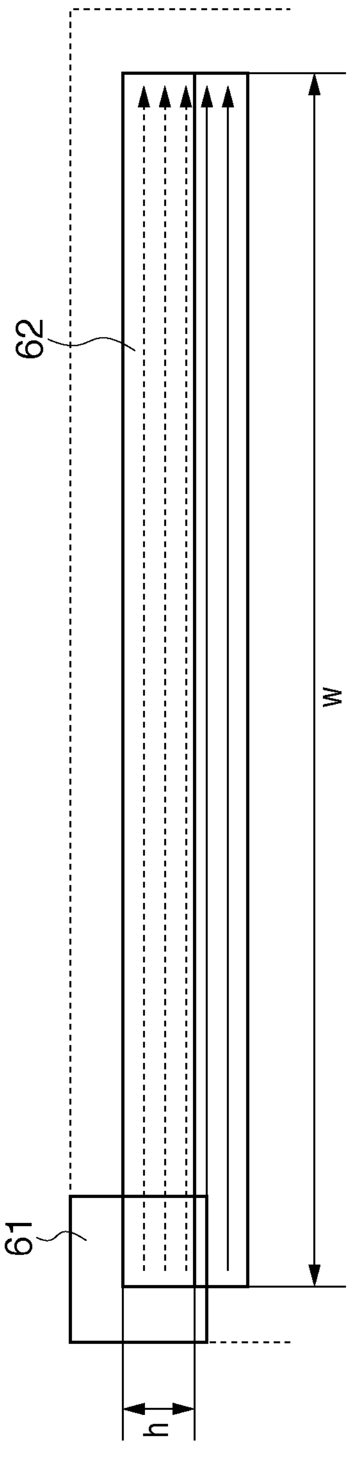
FIGS. 6A and 6B are explanatory views showing a difference by a scanning method in a pixel hold region necessary for reference image generation by mirroring.
Figure 6B:
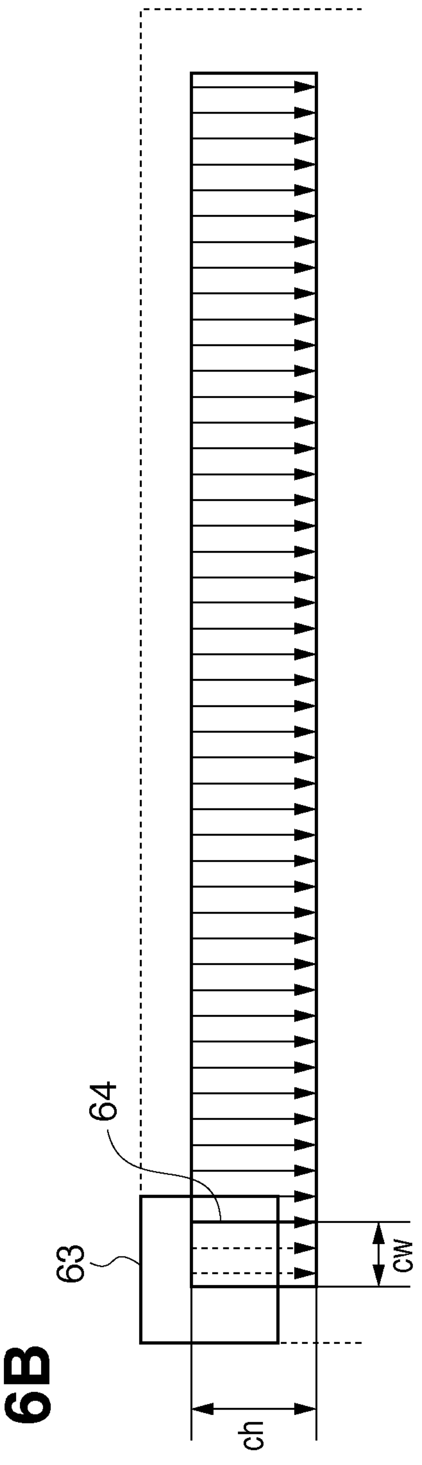

In the example of FIG. 5, the pixels of the reference image in the inframarginal reference region are generated by mirroring pixels in the vicinity of the outer edge of the input image, with the end of the input image as a center. FIGS. 6A and 6B show pixel ranges to be held upon execution of such reference image generation processing.

FIG. 6A shows a case where a band is processed by line-based processing. When filter processing requiring a range 61 is performed, it is necessary to hold pixels within a range 62 in a pixel data hold memory. In the region of the range 62, processing is sequentially performed on a right-side pixel, and accordingly, it is necessary to hold pixels included in the upper end 1 line used for image stretching into the reference region until the filter region has completely passed the upper end line. Further, as the number of lines of the reference region is increased, images in the second and third lines of the input image are required for generation of a mirror image. Accordingly, as the number of lines added to the upper and lower ends of the input image as a reference image is increased, the height of the pixel hold region is increased.

In the case of the line processing, the size of data to be held in the pixel data hold memory is determined such that a lateral width w is a maximum processible image width, and a height h is the number of lines of the larger one of an upper reference image or a lower reference image. As a result, the memory size necessary for the pixel data hold memory is about h×w.

On the other hand, FIG. 6B shows data to be held in the pixel data hold memory 25 when crossband processing is used. When crossband processing is used, the pixel range necessary for filter processing requiring a range 63 corresponds to a range 64. In comparison with the line processing (FIG. 6A), the capacity of the pixel data hold memory can be greatly reduced.

Further, when the region shown with the range 62 in FIG. 6A is held, a necessary memory capacity cannot be determined without estimation of a maximum processible image width (w).

On the other hand, information necessary to hold the range 64 in FIG. 6B can be obtained by estimation of a maximum height of a band (ch) upon band processing. Thus the design can be made using a parameter not influenced by the size of the image to be processed. In this arrangement, processing without limitation of size of image to be processed can be implemented.

Further, a lateral width cw of the pixel data hold memory in the crossband processing is determined based on the width of the larger one of a left reference image and a right reference image, and the height ch is determined based on a maximum number of processible band lines. In this manner, the size of the pixel data hold memory 25 is cw×ch, which is much smaller than the size h×w in the line processing. As described above, the memory size can be determined only based on image processing parameters, the peripheral image size necessary for implemented image processing such as filter processing and a band size as a process unit, and thus the memory size can be determined independently from the size of an input image. Accordingly, the processible line with w or the like in image processing is not limited at all.

Figure 7:
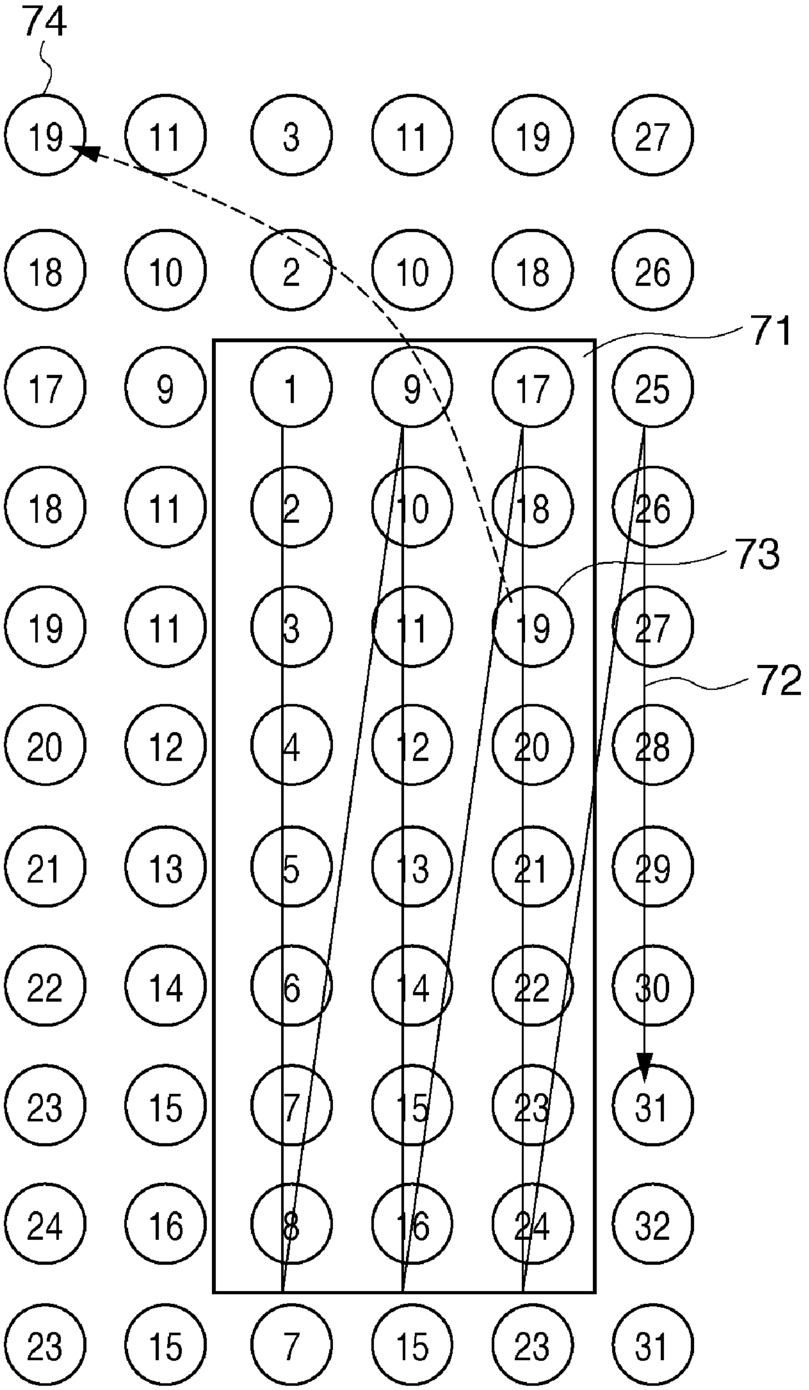
FIG. 7 is an explanatory view of a pixel hold buffer in the crossband scanning method and a pixel reference method upon reference image generation.

FIG. 7 shows a conception of processing for generating reference pixels around an input image, by using the pixel data hold memory 25 holding the image data shown in the range 64 in FIG. 6B. Numeral 71 denotes a pixel range held in the pixel data hold memory 25 to hold past inputted pixel data, upon processing of pixels in the crossband direction (vertical direction). The pixels within the pixel range indicated with the frame 71 are held in the pixel data hold memory 25, and are referred to by the reference image generation processing.

Numeral 72 denotes an arrow to indicate the order of pixel values inputted into the pixel data hold memory 25. Numeral 73 denotes a pixel necessary for generation of a reference pixel in, for example, a position denoted by numeral 74. In the example of FIG. 7, upper reference pixels form 2 upper lines; lower reference pixels form 1 lower line; and left reference pixels form 2 columns. For example, to output the pixel 74 as an initial reference pixel, it is necessary to input the pixel 73 with a pixel number (19) in at least a mirroring position. Further, to output all the pixels in an initial column, it is necessary to input pixels up to a pixel number (24). Note that in the example of FIG. 7, by holding the pixel values within the frame 71 shown in FIG. 7, image processing can be performed on the respective pixels with pixel numbers (1) to (8), and it is not necessary to overlap band images. In a case where band images are overlapped, that is, when re-read processing is performed to perform image processing, assuming that upper reference pixels form 2 upper lines and lower reference pixels form 1 lower line, as lower reference pixels, since the upper 2 lines are consumed as an overlap width, pixels with pixel numbers (3) to (7) are processed.

In this manner, to generate a reference image, it is necessary to first perform processing to hold an input image, then determine whether or not sufficient pixel data has been held, then calculate a reading position of an output pixel and read the pixel, and output the pixel. The above determination is performed by the output pixel position counter 26 as described above.

At this time, the least number of pixels to be held in the pixel data hold memory 25 is the least number of held pixels (upon generation of left margin)=(width of left reference image+1)×number of band lines . . . (Expression 1).

Note that a value obtained with the expression 1 is the least number of held pixels necessary for reference by the input pixel position counter 22 to determine the possibility of the start of output. The input pixel position counter 22 detects input of this number of pixels, and thereby determines that the condition for the start of output has been satisfied. When the input pixel position counter 22 determines that the condition for the start of output has been satisfied, it issues a reading processing start trigger to the output pixel position counter 26.

Thereafter, the input pixel position counter 22 controls the processings on the input side by the band divided image input unit 12 and the scan conversion unit 13 to suspend pixel input by the completion of output of the "left reference image width+1" column region including the reference region. Note that as described above, it may be arranged such that the supply of pixel data to the image processing unit 15 is started (supply of the pixel value from the pixel 74 is started) from a time point at which the pixel value of pixel number (19) in FIG. 7 has been held. In this case, the allowance of the start of output by the output pixel position counter 26 is earlier than the timing shown with the expression 1.

Next, image processing on the band image is continued, and finally, the least number of held pixels necessary for generation of a right reference image is the least number of held pixels (upon generation of right margin)=(width of right reference image+1)×number of band lines . . . (Expression 2).

These conditions indicated with the expressions 1 and 2 are different from the condition for a determination of the memory size of the pixel data hold memory 25. The condition for determination of the memory size of the pixel data hold memory 25 is a size to hold the larger one of the expressions 1 and 2, but is not determined with the expression 1 or 2.

The above expression 1 is defined as a regulation of the minimum time to start the output of reference image with respect to pixel input from the head. Accordingly, when the width of the left reference image is smaller than that of the right reference image, it is not necessary to fully hold the pixels in the prepared memory, and output of the reference image can be started when the condition of the expression 1 is satisfied.

Regarding the generation of the right reference image, the condition is that the number of pixels held in the memory satisfies the expression 2. The timing of start of processing is the time point at which the input of all the pixels included in the band region of the input image has been completed.

Further, regarding the number of lines of the upper reference image, it is necessary that the following relation is satisfied.

number of band lines≧number of lines of upper reference image+1 (Expression 3)

Similarly, regarding the number of lines of the lower reference images, it is necessary that the following relation is satisfied.

number of band lines≧number of lines of lower reference image+1 (Expression 4)

Conversely, to enable processing the number of processible band lines which satisfies the both relations is the design condition of the reference image generation processing in the present embodiment.

As the size of a reference image is determined based on a reference range of peripheral pixels in filter processing or the like, the size is determined with an image processing parameter in processing executed as image processing such as filter processing. As the memory capacity necessary for generation of a reference image in conventional line-based processing, image size×number of lines of upper reference image holds. For example, in general print density in print image processing, 600 dpi, the lateral width of an A4 size sheet is 5000 pixels. In, for example, 7×7 filter processing, the number of lines of a reference image is 3 lines, and in calculation with 3 bytes per 1 pixel, it is necessary to install a memory having a capacity for 5000×3×3=45 KB. When a memory with this size is installed in, for example, the hardware, a comparatively high cost is required.

On the other hand, the memory size necessary in the cross-band processing is, assuming that the width of the upper/lower/left/right reference images is 3 lines and 3 columns, (3+1)×(3+1)×3 bytes=56 bytes. However, as band lines for filter processing are actually supplied, the number of band lines is at least 7. Accordingly, the necessary memory size is (3+1)×7×3 bytes=84 bytes. It is understood from this size that a great advantage of cost reduction can be obtained by the present embodiment.

Figure 8:
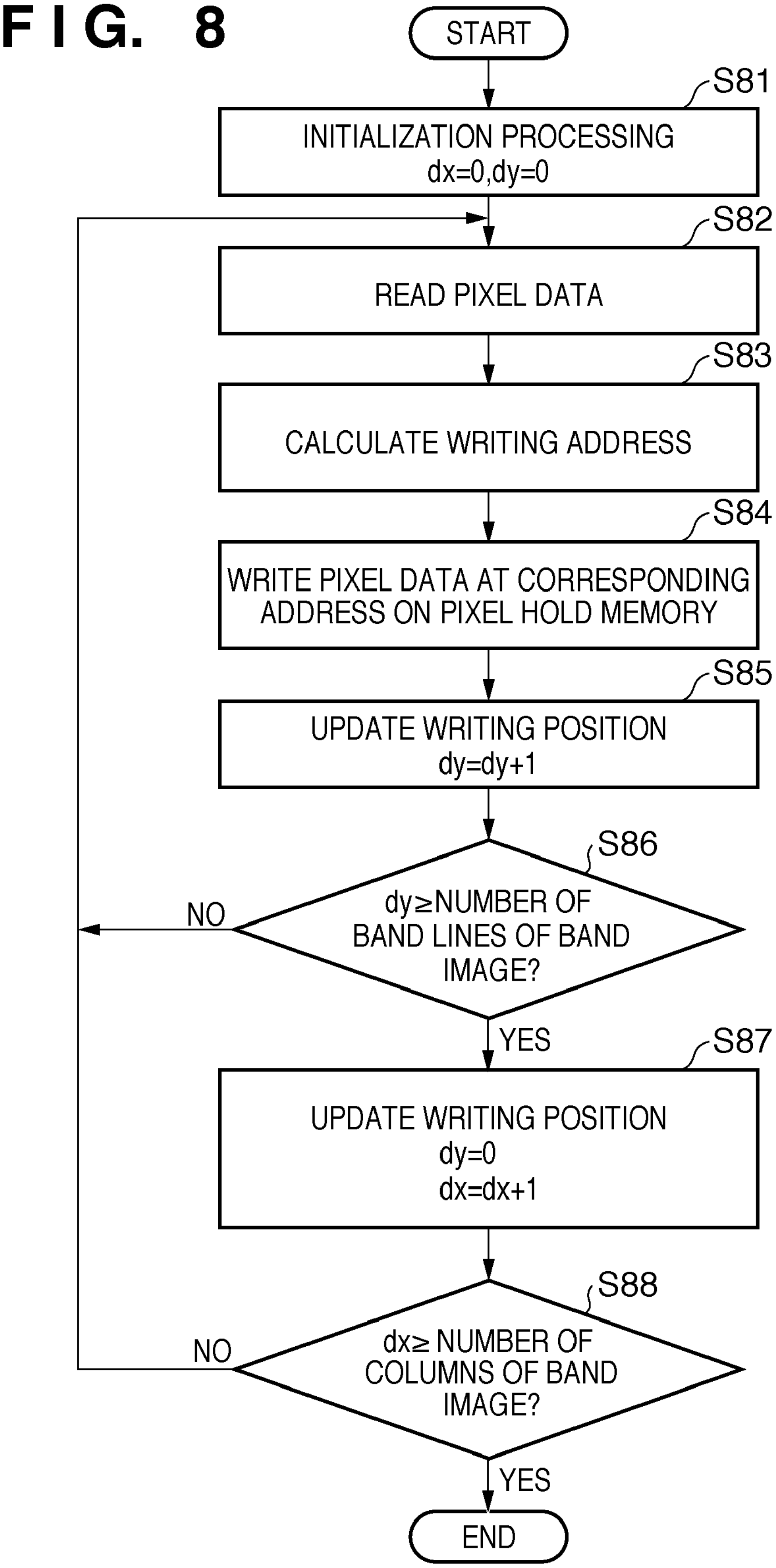
FIG. 8 is a flowchart showing write processing to an input pixel hold buffer in the reference image generation unit in the first embodiment.

FIG. 8 is a flowchart showing write processing to the pixel data hold memory 25 according to the first embodiment.

First, in step S81, the input pixel position counter 22 initializes a pixel position (dx,dy) in a band image of inputted pixel data to (0,0). Next, in step S82, when a pixel value is inputted from the image input unit 21, then at step S83, the storing address generation unit 23 obtains a storing address with the following expression 5. More particularly, the storing address generation unit 23 obtains a storing address (WriteAddress) using a pixel position (dx,dy) from the input pixel position counter 22 and a pixel storing memory effective pixel width bw, obtained by adding 1 to the larger one of left and right reference regions, with the following expression 5.

$$\text{WriteAddress}=(dx \,\%\, bw)+dy*bw \quad \text{(Expression 5)}$$

dx % bw is a remainder of division of dx by bw. Note that values of dx and dy are initialized at step S81 and updated at steps S85 and S87 later.

Note that in the expression 5, 1 pixel is stored at 1 address. Accordingly, for example, when 1 pixel of an RGB image or the like is stored at plural addresses, the expression 5 is multiplied by the number of addresses necessary for storage of the 1 pixel data, thereby calculating the storing addresses.

Next, at step S84, the pixel writing unit 24 stores the input pixel data at the storing address of the pixel data hold memory 25 generated by the storing address generation unit 23 at step S83. Then at step S85, the input pixel position counter 22 adds 1 to the value dy.

In step S86, it is determined whether or not the value dy has reached a predetermined number of band lines (maximum number of band lines in the band image). When it is determined that the value dy has reached the predetermined number of band lines, the process proceeds to step S87. In step S87, the input pixel position counter 22 initializes the value dy to 0, and adds 1 to the value dx. Then in step S88, it is determined whether or not the value dx has reached a predetermined number of columns (maximum number of columns in the band image). When it is determined that the value dx has not reached the predetermined number of columns, as pixels to be read from the band image remain, the process returns to step S82. When it is determined in step S86 that the value dy has not reached the predetermined number of band lines, the process returns to step S82, to accept input of the next pixel data. Further, when it is determined in step S88 that the value dx has reached the predetermined number of columns, as all the pixel values regarding the band image have been inputted, the process ends.

In this manner, input pixels are sequentially stored in the pixel data hold memory 25, and when data necessary for generation of a reference image has been stored in the pixel data hold memory 25, the pixel values are read as described in FIG. 7. By this processing, a reference image like a mirror image is generated. Hereinbelow, a procedure of reading of pixel values from the pixel data hold memory will be described.

Figure 9:
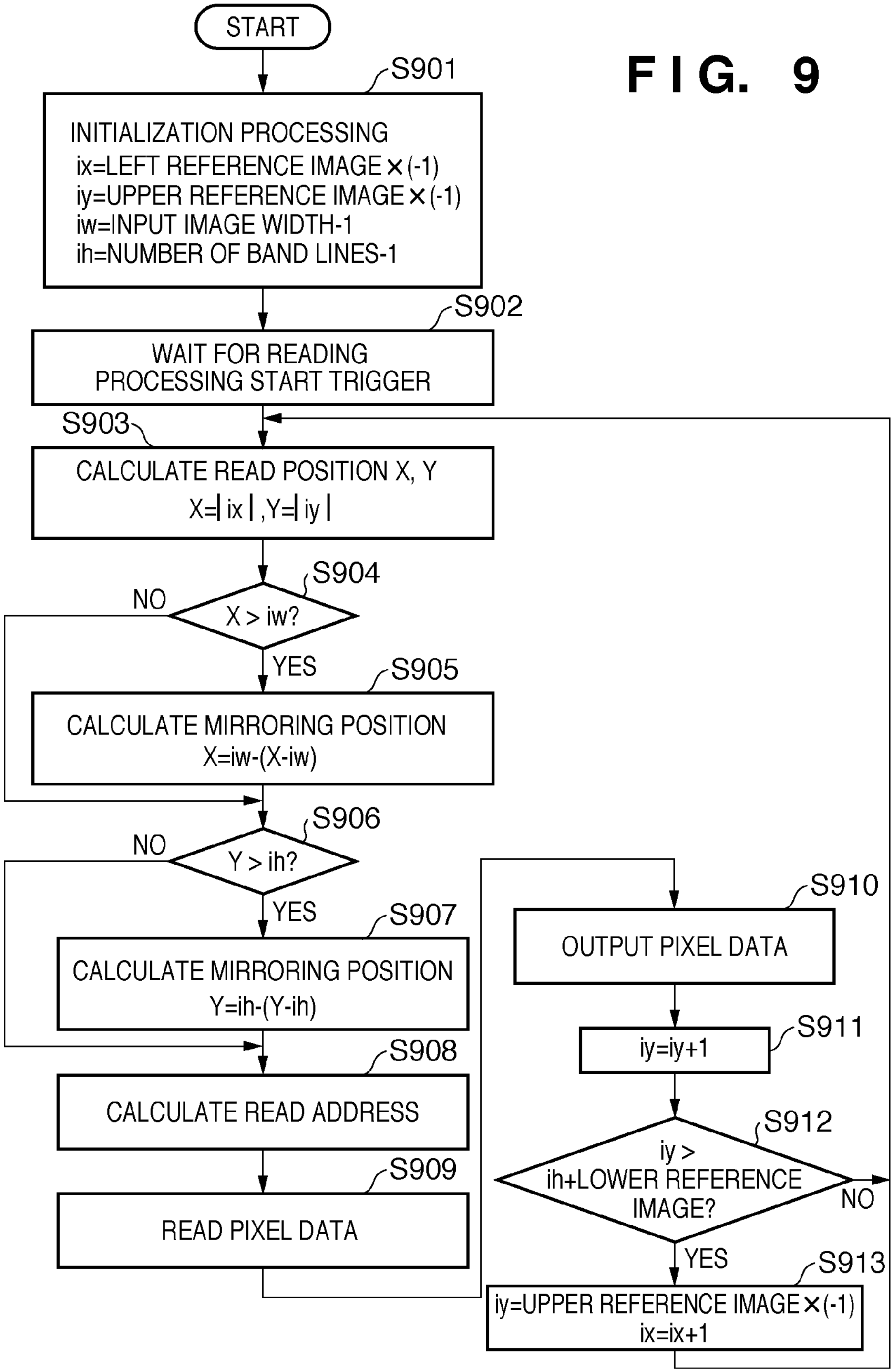
FIG. 9 is a flowchart showing output pixel reading processing from the hold buffer in the reference image generation unit in the first embodiment.

FIG. 9 is a flowchart showing read address generation processing to obtain output pixel data according to the present embodiment.

Upon start of reading of a pixel value regarding a band image from the pixel data hold memory 25, first, in step S901, the output pixel position counter 26 initializes an output pixel position (ix,iy) and an output end position (iw,ih). The initialization is performed with the following expressions 6 to 9. Note that in the initialization, as a left end column of an inputted band image, ix=0 holds, and as an upper end line, iy=0 holds. Further, in the example of FIG. 7, in an outputted band image (band image complemented with reference regions), as a left end column, ix=−2 and iy=−2 hold.

$$ix=\text{number of columns of left reference image}\times(-1) \quad \text{(Expression 6)}$$

$$iy=\text{number of lines of upper reference image}\times(-1) \quad \text{(Expression 7)}$$

$$iw=\text{input image width}-1 \quad \text{(Expression 8)}$$

$$ih=\text{number of band lines}-1 \quad \text{(Expression 9)}$$

Next, in step S902, the output pixel position counter 26 waits for a reading processing start trigger from the input pixel position counter 22. When output processing has been started in accordance with the reading processing start trigger, then in step S903, the read address generation unit 27 obtains a read position (X,Y) on the pixel data hold memory 25 from the output pixel position (ix,iy) with the following expressions 10 and 11.

$$X=|ix| \quad \text{(Expression 10)}$$

$$Y=|iy| \quad \text{(Expression 11)}$$

Next, in step S904, it is determined whether or not the value ix exceeds the value iw. The value iw is an x-coordinate of the output end position. When it is determined that the value ix exceeds the value iw, the process proceeds to step S905, at which the read address generation unit 27 obtains the value X by the following processing. When it is determined that the value X exceeds the value iw, $$X=iw-(ix-iw) \quad \text{(Expression 12)}$$

Similarly, in step S906, it is determined whether or not the value iy exceeds the value ih. The value ih is a y-coordinate of the output end position. When it is determined that the value iy exceeds the value ih, the process proceeds to step S907, at which the read address generation unit 27 obtains the value Y by the following processing.

$$Y=ih-(iy-ih) \quad \text{(Expression 13)}$$

These expressions 12 and 13 are employed for mapping a runover of an input image region to the inside the image.

Then in step S908, the read address generation unit 27 obtains a read address (ReadAddress) of the pixel data hold memory 25 from the obtained position (X,Y) with the following expression 14.

$$\text{ReadAddres}=(X \,\%\, bw)+Y*bw \quad \text{(Expression 14)}$$

Note that the value X % bw is a remainder of division of the value X by the value bw. As described above, the value bw is an effective pixel width of the pixel hold memory.

In step S909, the pixel reading unit 28 reads pixel data from the pixel data hold memory 25 using the read address calculated in step S908. Then in step S910, the image output unit 29 outputs the pixel value read by the image reading unit 28.

In this manner, the reference image generation processing by image mirroring is performed. Note that as in the case of the write address, the expression 14 is used for storing 1 pixel at 1 address. Accordingly, for example, when 1 pixel of an RGB image or the like is stored at plural addresses, the entire right side of the expression 14 is multiplied by an address width necessary for storage of 1 pixel, thereby calculating the read addresses.

As described above, when the address has been calculated and the pixel data has been read from the pixel data hold memory 25, the process proceeds to step S911. In step S911, the output pixel position counter 26 adds 1 to the value iy.

In step S912, the output pixel position counter 26 determines whether or not the value iy exceeds the number of output band lines+the number of lines of the lower reference image. When it is determined that the value iy exceeds the number of output band lines+the number of lines of the lower reference image, then in step S913, the output pixel position counter 26 initializes the value iy again by the expression 7, and adds 1 to the value ix. When it is determined in step S912 that the value iy does not exceed the number of output band lines+the number of lines of the lower reference image, the process returns to step S903, to perform the next pixel output.

At this time, as processing control, input data is not accepted while the left reference image is generated and input pixel of the first column is outputted, so that the pixel data hold memory 25 has a minimum necessary size.

As described above, the memory necessary for generation of a reference image according to the algorithm disclosed in the first embodiment is a very small size calculated as (maximum number of band-processible lines)×(number of columns of the larger one of left and right reference images)×(number of bytes per 1 pixel) (Expresion 15)

Accordingly, a processing module to perform reference image generation in correspondence with various image sizes can be installed at a low cost.

Figure 10:
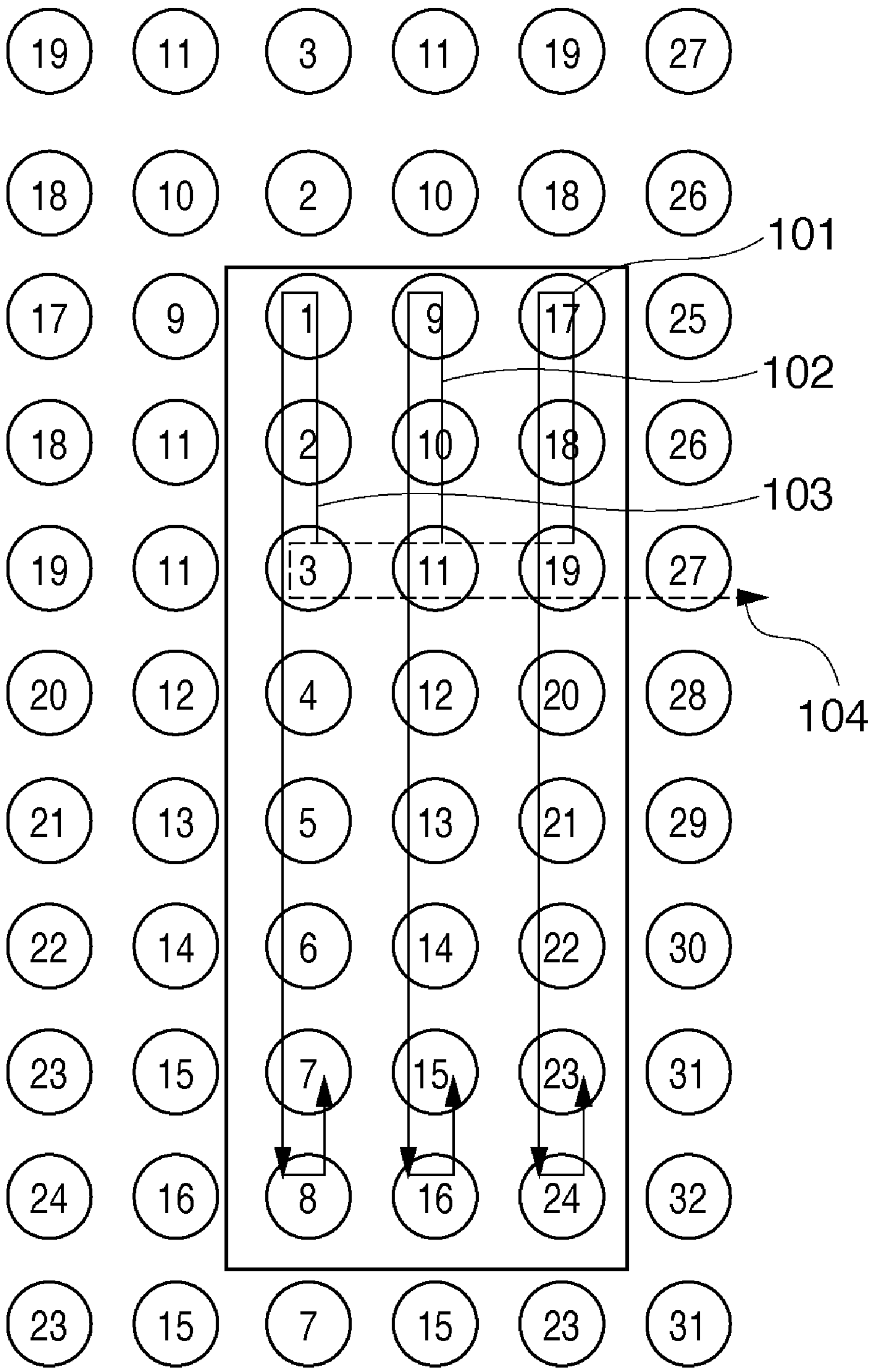
FIG. 10 is a conceptual diagram of an output pixel reference order in the reference image generation unit according to the first embodiment.

FIG. 10 shows the operation of an address calculated as above on the pixel data hold memory 25.

An arrow 101 indicates a locus of movement of the value Y in reading of a pixel value in output first column (first column in reference region). An arrow 102 indicates a locus of movement of the value Y in reading of a pixel value in output second column. An arrow 103 indicates a locus of movement of the value Y in reading of a pixel value in output third column. An arrow 104 indicates a locus of the value X which moves by output column. In the figure, the movement of initially read pixel is shown in the first column, the second column, the third column and the subsequent columns.

Figure 11:
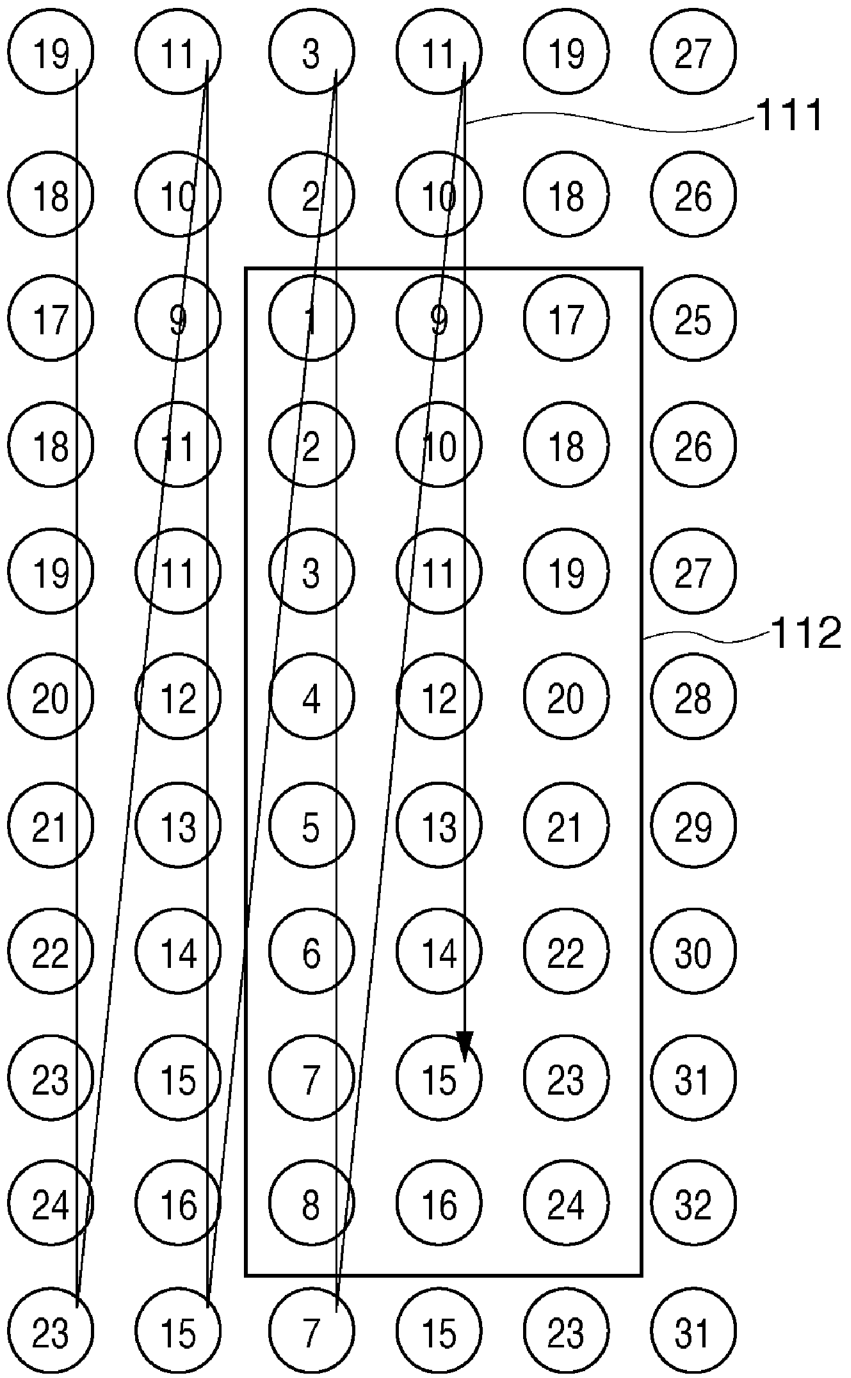
FIG. 11 is an explanatory view of an output pixel coordinate position in the reference image generation unit according to the first embodiment.

FIG. 11 shows the array of the output pixels and output order upon output of pixels obtained by the above-described read address calculation. Numeral 111 denotes an output order of outputted pixels. Note that in the example of FIG. 11, the upper reference region forms 2 lines; the lower reference region forms 1 line; and the left reference region forms 2 columns. Further, as a reference region is formed by band image and image processing is completed by band, reading is performed to a lowermost end line (line of pixel numbers (23), (15), . . . (31) below a frame 112) in FIG. 11.

When it is arranged such that re-read processing to repeatedly read an overlap region is performed, reading is performed to a line of pixel numbers (24), (16), (8) to (24). Then, in the next band, a band image from a line of pixel numbers (22), (14) to (30) is overlapped and obtained.

As described above, according to the first embodiment, a desired reference image can be generated using the pixel data hold memory 25 having a size smaller than an actually-outputted pixel range and independent of input image size.

The algorithm to install a small capacity memory for reference image generation by band has been described as above. However, as already shown in FIG. 5, generally, the number of lines in 1 page image is larger than that of 1 band image range. Accordingly, in an upper end portion of 1 page image, it is necessary to generate an upper reference image and left and right reference images. Thereafter, only processing to generate left and right end reference images is required until the process comes to a lower end of the 1 page image. Further, at the lower end of the 1 page image, it is necessary to generate left and right reference images and a lower reference image. In this manner, upon generation of reference images around a page, without management of position of currently-processed band in the page, reference images around the page cannot be generated.

Figure 12:
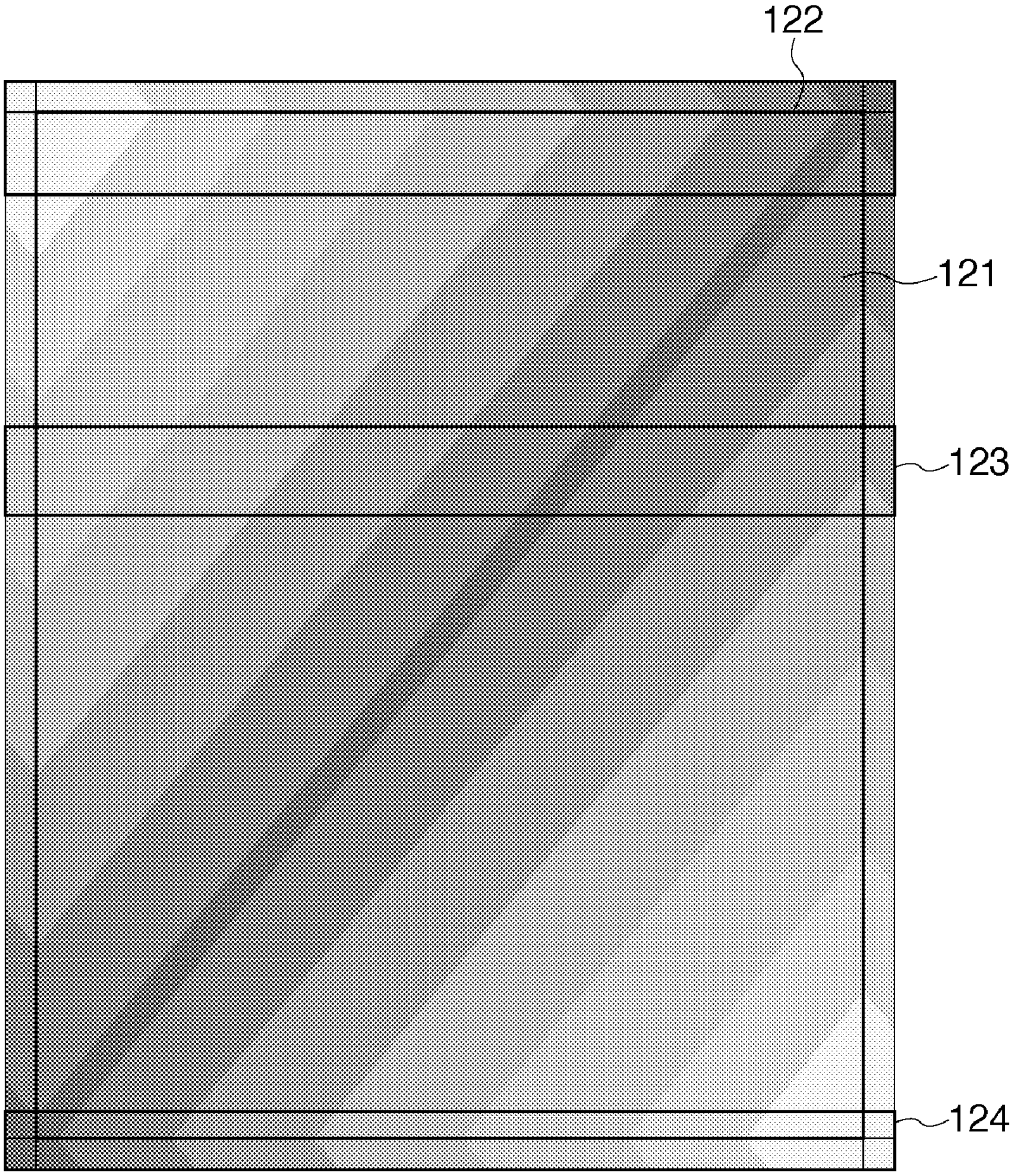
FIG. 12 is an explanatory view of the mutual relation between band positions in the upper end, the middle portion and the lower end of a page and a page image range according to the first embodiment.

Accordingly, next, coordinate management processing regarding reference image generation by page will be described. FIG. 12 is an explanatory view of positional relation of band images with respect to an entire input image.

Reference numeral 121 denotes an entire input image; reference numeral 122 denotes a band image to process a region in contact with an upper end of the input image 121; reference numeral 123 denotes one of band images in a region not in contact with any of the upper and lower ends of the input image; and reference numeral 124 denotes a band image including a lower end of the input image. In the region of the band image 122, it is necessary to perform processing to generate an upper reference image in addition to left and right reference images.

Accordingly, in the reference image generation processing, it is necessary to manage a line position of each band in the input image. In the present embodiment, a variable py to indicate a line position in the page is provided. The variable py is initialized at the head of an input image, and upon completion of each band processing, the number of lines to the next band input head line is added to the variable py. By referring to the variable py, the line position of each band in the input image can be managed.

When py=0 holds, control is performed such that generation of an upper reference image is performed. More particularly, the expressions 6 to 9 as initialization in band processing are executed.

When the variable py is not 0, and the value obtained by adding the number of band lines to the variable py does not exceed the number of height lines of the input image, the y-coordinate of output pixel position, iy, is initialized with the following expression 16 in place of the expression 7.

$$iy=0 \quad \text{(Expression 16)}$$

Further, when the variable py is not equal to or greater than the number of height lines of the input image, and the value obtained by adding the number of band lines to the variable py exceeds the number of height lines of the input image, the y-coordinate of output end position, ih, is calculated by using the following expression 17 in place of the expression 9.

$$ih=\text{number of bund lines}-1+\text{lower reference image} \quad \text{(Expression 17)}$$

Further, when the variable py is 0 and the value obtained by adding the number of band lines to the variable py exceeds the number of height lines of the input image, the value ih is initialized with the following expression 18 in place of the expression 9.

$ih$=number of band lines−1+upper reference image+lower reference image (Expression 18)

Further, in the region indicated with the band image 123, left and right reference images are generated. In this case, at the head of band processing, the output pixel position (ix,iy) and the output end position (iw,ih) are initialized with the following expressions 19 to 22 in place of the expressions 6 to 9.

$ix$=left reference image×(−1) (Expression 19)

$iy$=0 (Expression 20)

$iw$=input image width−1 (Expression 21)

$ih$=number of band lines−1 (Expression 22)

On the other hand, regarding the region of the band image 124, two different processing contents are required. One processing is the above-described generation of left and right reference images. The other processing is based on a fact that generally the height of an input image is not always a multiple of the number of lines of 1 band. That is, in some cases, a lower part image of an image inputted as a band image is initially not in an image range to be processed. In this case, in the reference image generation processing, from a line in the middle of the band image, pixels generated as a reference image using data of lines inputted by that time are outputted.

Figure 13:
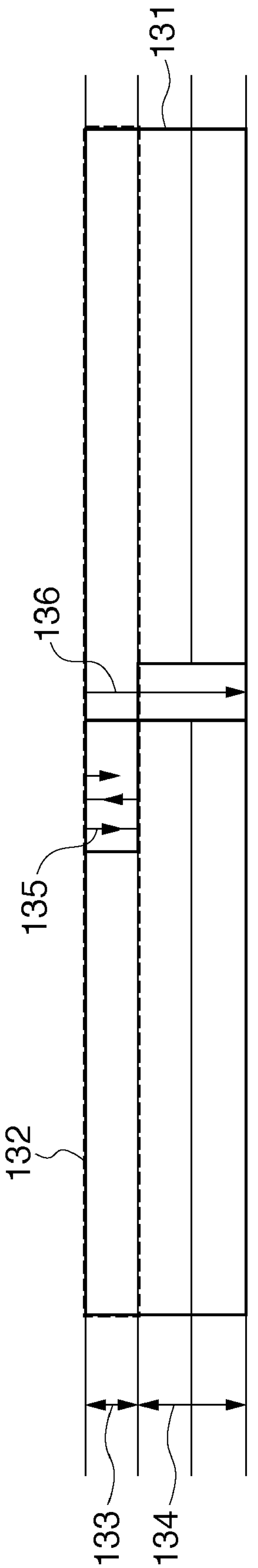
FIG. 13 is an explanatory view of an output pixel coordinate position in a band position at the lower end of the page in the reference image generation unit according to the first embodiment.

FIG. 13 shows the above status. In FIG. 13, numeral 131 denotes a band processing region including a lower end of an input image. A region 132 surrounded with a broken line indicates a range meaningful as an input image among lines inputted by band processing. Upon input of a page image, in the band processing region 131, lines to the line indicated with the region 132 are given as an input image. Regarding the other lines, since data previously stored on the memory or the like is read, the other lines correspond to inappropriate image region as an input image.

In this manner, an image which can be handled as an input image is stored only in the region 132 in the inputted band image. The other lines correspond to a reference region in which some image data is generated using the image shown in the region 132 and embedded the lines with the generated image data.

In this case, the lower reference pixels may be generated by referring to pixels in mirroring positions as described above. However, in the status shown in FIG. 13, data for reference image generation is short. That is, the number of effective lines 133 in the inputted band image region may be smaller than the number of lines 134 to be generated, and reference pixel positions may not exist in the band by merely referring to the mirroring positions.

In this case, output pixels are read by reciprocated reference to the effective pixel range as indicated with an arrow 135, as pixel value output as indicated with an arrow 136. By this arrangement, the short input image and reference image can be generated while image continuity is maintained.

Second Embodiment

When a reference image is added, in the above-described first embodiment, a mirror image is used as a reference image, however, the present invention is not limited to the mirror image. In the second and third embodiments, having the same configuration as that of the first embodiment, an image different from a mirror image is adopted as a reference image. For example, a pixel of a reference image may be generated by stretching only pixels at an upper/lower/left/right end of an input image. In this case, as the reference image generation processing, the reference image generation using a mirror image or the reference image generation by stretching of end pixels may be selected by mode designation or the like. In such case, as long as a memory necessary for mirroring is installed, the selection of reference image generation can be realized only by selection of reference address generation method.

Figure 14:
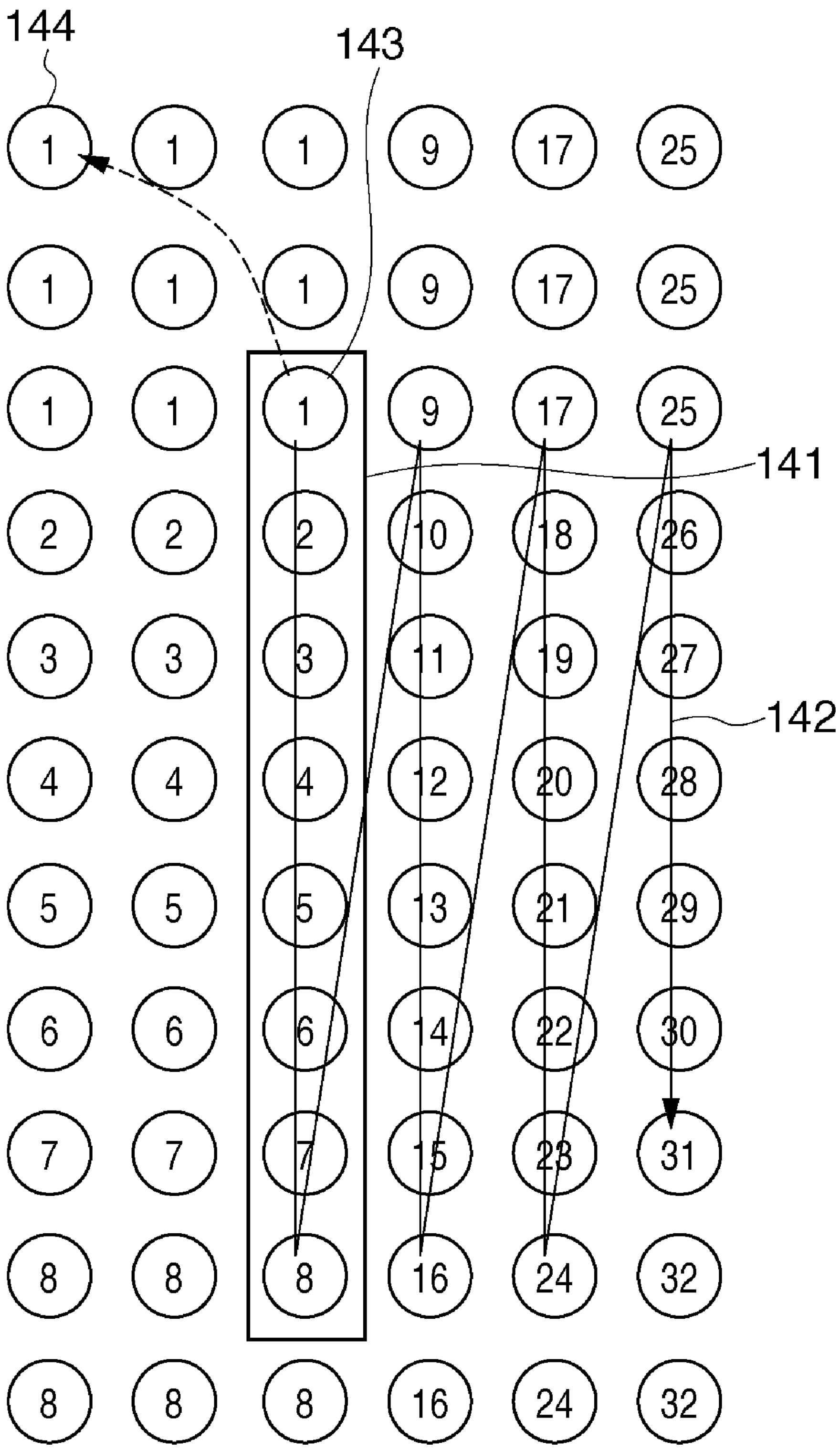
FIG. 14 is an explanatory view of an output pixel coordinate position in the reference image generation unit according to a second embodiment of the present invention.

FIG. 14 shows generation of a reference image by stretching of only a pixel at an upper/lower/left/right end of an input image. This reference image generation is realized by converting a pixel position in a reference region to a storing address in the pixel data hold memory 25 such that the pixel value of the pixel position in the reference region becomes a pixel value in a pixel position closest to a band image. That is, a read position (X,Y) is calculated with the following expressions in place of the expressions 10 to 13 given in the first embodiment.

$X=ix$ (Expression 23)

$Y=iy$ (Expression 24)

Note that when ix is a negative value, $X=0$ (Expression 25)

When iy is a negative value, $Y=0$ (Expression 26)

Further, when ix exceeds iw, $X=iw$ (Expression 27)

When iy exceeds ih, $Y=ih$ (Expression 28)

That is, regarding a runover from an input image region, in the lateral direction, a reference image is generated by duplicating image data of a 0-th column or a final column. Further, in the vertical direction, a reference image is generated by duplicating image data of a 0-th line or a final line.

Next, a memory size necessary in this case and arrangement of input and output pixels will be described with reference to FIG. 14.

A pixel range necessary for generation of a reference image referred to in the above calculation method is 1 column and 1 line at an end of an input image. Accordingly, in the second embodiment, a memory having a size represented with the following expression 29, smaller than the memory size shown in the first embodiment, can be installed.

(maximum number of band-processible lines)×(1 column)×number of pixel bytes (Expression 29)

In FIG. 14, a frame 141 indicates the above expression.

In FIG. 14, an arrow 142 indicates an input order in a crossband data flow of input pixels. In this case, for example, an initially outputted pixel 144 corresponds to an initially inputted pixel 143.

Thereafter, by the position calculation expressions in the first embodiment, as the values ix and iy are continuously negative for a while, the pixel 143 (pixel with a pixel number (1) in FIG. 14) is continuously read and outputted. Thereafter, in a position where the value iy is equal to or greater than 0, pixels with pixel numbers (2), (3), (4) . . . of the input pixels are sequentially read and outputted. In the next column, as the value ix, a position ahead of a head position of previous input pixel, that is, a negative position is to be read, the value ix is again replaced with 0, and reading is performed from the pixel (1). Thereafter, processing when ix is 0 has been started, then, new input pixels are sequentially accepted from the completion of reading regarding the value iy. Thus, pixels with pixel numbers (9), (10), (11) . . . as input in the next column are written into the pixel data hold memory 25, thereby processing is performed while a reference image is sequentially generated by column.

Finally, in right reference image generation processing, when the value ix exceeds the value iw, the value ix is replaced with the value iw. Accordingly, pixels in a final column are repeatedly outputted, and reading processing is completed.

As described above, when reference image generation is performed by simply duplicating pixels at an end of an input image, the processing can be realized with a further smaller memory capacity. This achieves a lower cost.

Further, in the memory installation, a minimum memory size is given, and when a memory having a larger memory size is installed, the above-described respective embodiments can be realized without any problem. That is, as processing to use a limited range of reference on an installed memory is performed, there is no problem even when a memory having a capacity larger than the minimum memory capacity is installed.

Accordingly, even in installation of a memory for reference image generation processing using a mirror image as described in the first embodiment, the reference image generation processing by duplication of end pixels as described in the second embodiment can also be performed. That is, it is apparent that these processings can be selected by some mode selecting unit.

Third Embodiment

In the first and second embodiments, upon generation of a reference image, simply 1 input pixel value is used for generation of 1 pixel data, however, the present invention is not limited to this arrangement. For example, it may be arranged such that a pixel value obtained by performing averaging processing on plural input pixel values is outputted as a reference pixel. In this case, especially in the reference image generation by duplication of end 1 pixel as shown in the second embodiment, a problem, which occurs when only the pixel (1) in FIG. 14 has a value greatly different from peripheral pixel values, can be solved.

In this case, the range of pixels subjected to averaging may be an arbitrary range corresponding to one or more pixels. When averaging is performed in a range for many pixels, as a mirror image can be used as described in the first embodiment, the range of pixels subjected to averaging can be limited to several pixels.

In such case, a base point position upon averaging processing can be obtained with the expressions 23 to 28 shown in the above-described second embodiment. In the third embodiment, based on the base point pixel position obtained as above, pixels in a designated adjacent range are read and subjected to averaging. Then the obtained average pixel value is outputted as an output pixel. That is, the read address generation unit 27, generates read addresses so as to obtain pixel values in a range of predetermined number of lines or a predetermined number of columns from the pixel data hold memory 25, with a pixel position in a band image closest to a pixel position in a reference region as a base point. Accordingly, in the third embodiment, regarding 1 pixel position in a reference region, plural read addresses for the pixel data hold memory 25 are generated. Then, the image output unit 29 outputs an average value of pixel values read from the plural read addresses by the pixel reading unit 28, as a pixel value in a pixel position in the reference region.

Figure 15:
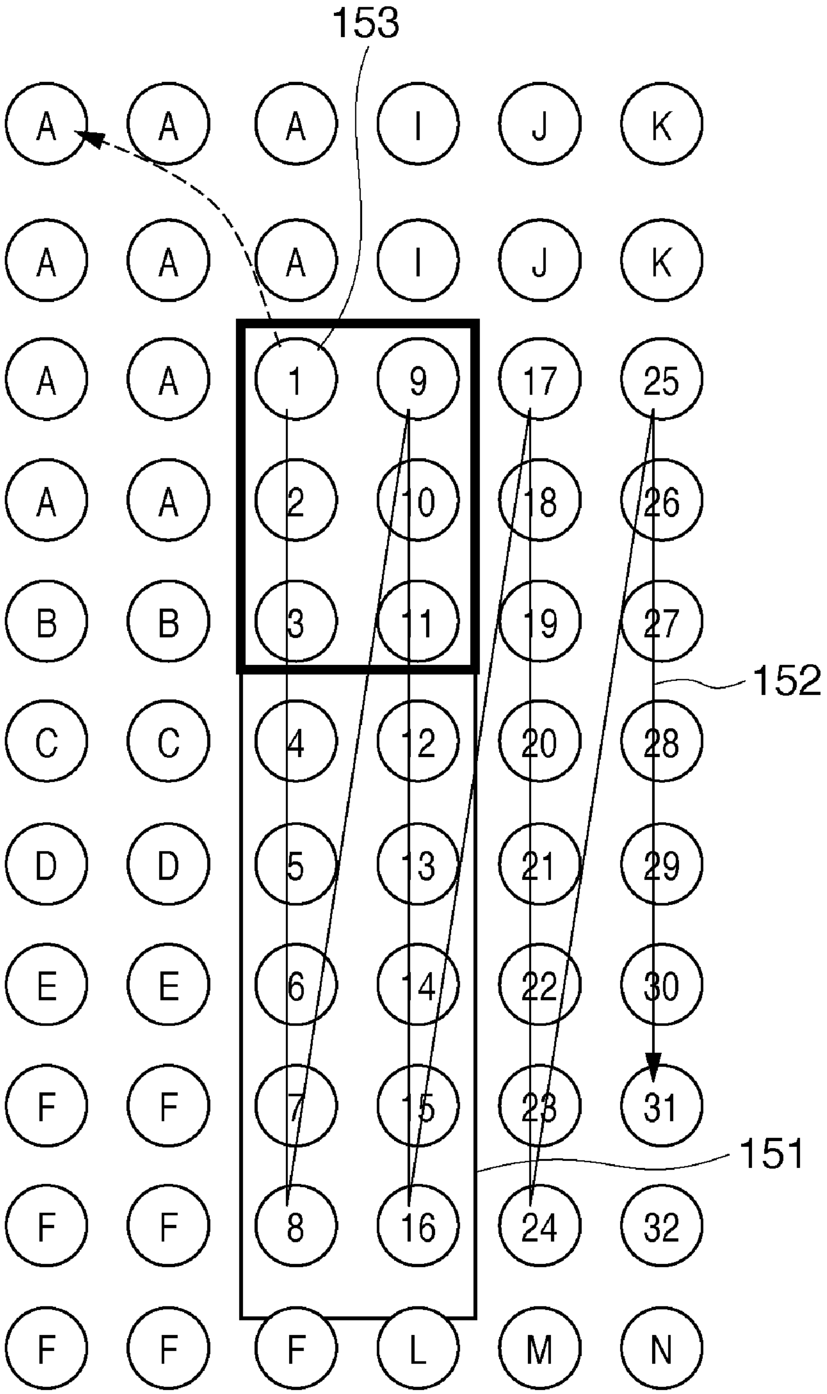
FIG. 15 is an explanatory view of an output pixel coordinate position in the reference image generation unit according to a third embodiment of the present invention.

In this case, a memory as a necessary pixel hold unit is represented as (maximum number of band-processible lines)×(number of columns subjected to averaging)×number of pixel bytes FIG. 15 shows the outline of processing according to the third embodiment. A frame 151 is a range of input pixel positions to a memory necessary in the third embodiment. An arrow 152 indicates an input order of pixels inputted along a crossband flow. A frame 153 indicates a range in which averaging is performed upon reference pixel generation. In the present embodiment, an average value of 2 columns×3 lines=6 pixels is used.

For example, when only the value of pixel (1) is different in the frame 153, in the second embodiment, as shown in FIG. 14, the pixel value of the pixel (1) is duplicated for 8 pixels as reference pixels. In this range, the result of image processing is influenced by the pixel (1) having one different value.

On the other hand, in the third embodiment, as a reference pixel is generated using an average value of pixels within a particular range (within the frame 153), the result of image processing at an end can be obtained without the influence of a particular pixel which initially has a small number of samples.

As described above, in the above-described respective embodiments, in the crossband processing, reference pixels around an input image can be efficiently generated by using a memory having a very small size proportional to a band height unrelated to the width and height of the image as a subject of processing.

The embodiments of the present invention have been described in detail as above. Further, the present invention can be implemented as a system, an apparatus, a method, a program or a storage medium. More particularly, the present invention can be applied to a system constituted by a plurality of devices or to an apparatus comprising a single device.

Further, the present invention includes a case where the functions of the above-described embodiments can be achieved by providing a software program directly or remotely to a system or apparatus, reading the supplied program code with a computer of the system or apparatus, then executing the program. In this case, the supplied program is a computer program corresponding to the flowcharts shown in the drawings in the embodiments.

In this case, the program code itself installed in the computer to realize the functional processing according to the present invention realizes the resent invention with the computer. That is, the computer program itself to realize the functional processing is included in the present invention.

In this case, so long as the system or apparatus has the functions of the program, the program may be executed in any form, such as an object code, a program executed by an interpreter, or script data supplied to an operating system.

Example of storage media that can be used for supplying the program are a floppy (registered trademark) disk, a hard disk, an optical disk, a magneto-optical disk, an MO, a CD-ROM, a CD-R, a CD-RW, a magnetic tape, a non-volatile type memory card, a ROM, and a DVD (a DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-329208, filed Dec. 20, 2007, which is hereby incorporated by reference herein in its entirety.

The invention claimed is:

1. A processing method for processing input pixel data by referring to pixel data of peripheral pixels, comprising:

a division step of dividing an input image in a first direction;

an input step of inputting pixel data of the divided image divided in the first direction in said division step in a second direction crossing said first direction at a right angle;

a storing step of storing the inputted pixel data into a memory;

an output step of, when a pixel to be referred to for processing the stored pixel data is not included in the divided image, generating an address for reading a reference pixel from the memory based on a position of the divided image in the input image and outputting pixel data of the reference pixel based on the address; and a process step of processing the stored pixel data by referring to the pixel data of the reference pixel.

2. The method according to claim 1, wherein at said output step, when the divided image is in contact with an upper end of the input image, pixel data of reference pixels corresponding to a region outside the divided image in contact with left or right ends and the upper end of the divided image are outputted based on the stored pixel data, and when the divided image is in contact with a lower end of the input image, pixel data of reference pixels corresponding to a region outside the divided image in contact with the left or right ends and the lower end of the divided image are outputted based on the stored pixel data, or when the divided image is not in contact with the upper end or the lower end of the input image, pixel data of reference pixels corresponding to a region outside the divided image in contact with the left and right ends of the divided image are outputted based on the stored pixel data.

3. The method according to claim 1, wherein at said output step, pixel data of a mirror image, with an end portion of the divided image as a center, is outputted as pixel data of reference pixels.

4. The method according to claim 1, at said output step, among said memorized pixel data, pixel data of a pixel in a position closest to a pixel to be referred to is outputted as pixel data of the pixel to be referred to.

5. The method according to claim 1, wherein at said output step, an average of pixel data of plural pixels corresponding to a predetermined region is outputted as pixel data of a pixel to be referred to.

6. A processing apparatus for processing input pixel data by referring to pixel data of peripheral pixels, comprising:

division means for dividing an input image in a first direction;

input means for inputting pixel data of the divided image divided in the first direction in a second direction crossing said first direction at a right angle;

a memory configured to store the inputted pixel data;

output means for, when a pixel to be referred to for processing the stored pixel data is not included in the divided image, generating an address for reading a reference pixel from the memory based on a position of the divided image in the input image and outputting pixel data of the reference pixel based on the address; and process means for processing the stored pixel data by referring to the pixel data of the reference pixel.

7. The apparatus according to claim 6, when the divided image is in contact with an upper end of the input image, said output means outputs pixel data of reference pixels corresponding to a region outside the divided image in contact with left or right ends and the upper end of the divided image based on the stored pixel data, and when the divided image is in contact with a lower end of the input image, said output means outputs pixel data of reference pixels corresponding to a region outside the divided image in contact with the left or right ends and the lower end of the divided image based on the stored pixel data, or when the divided image is not in contact with the upper end or the lower end of the input image, said output means outputs pixel data of reference pixels corresponding to a region outside the divided image in contact with the left or right ends of the divided image based on the stored pixel data.

8. The apparatus according to claim 6, wherein said output means outputs pixel data of a mirror image, with an end portion of the divided image as a center, as pixel data of reference pixels.

9. The apparatus according to claim 6, said output means outputs pixel data of a pixel in a position closest to a pixel to be referred to, among said memorized pixel data, as pixel data of the pixel to be referred to.

10. The apparatus according to claim 6, said output means outputs an average of pixel data of plural pixels corresponding to a predetermined region as pixel data of a pixel to be referred to.

11. A non-transitory computer-readable storage medium holding a computer program for processing input pixel data by referring to pixel data of peripheral pixels, wherein said computer program performs:

a division step of dividing an input image in a first direction;

an input step of inputting pixel data of the divided image divided in the first direction in a second direction crossing said first direction at a right angle;

a storing step of storing the inputted pixel data into a memory;

an output step of, when a pixel to be referred to for processing the stored pixel data is not included in the divided image, generating an address for reading a reference pixel from the memory based on a position of the divided image in the input image and outputting pixel data of the reference pixel based the address; and a process step of processing the stored pixel data by referring to the pixel data of the reference pixel.

12. The medium according to claim 11, wherein at said output step, when the divided image is in contact with an upper end of the input image, pixel data of reference pixels corresponding to a region outside the divided image in contact with left or right ends and the upper end of the divided image are outputted based on the stored pixel data, and when the divided image is in contact with a lower end of the input image, pixel data of reference pixels corresponding to a region outside the divided image in contact with the left or right ends and the lower end of the divided image are outputted based on the stored pixel data, or when the divided image is not in contact with the upper end or the lower end of the input image, pixel data of reference pixels corresponding to a region outside the divided image in contact with the left or right ends of the divided image are outputted based on the stored pixel data.

13. The medium according to claim 11, wherein at said output step, pixel data of a mirror image, with an end portion of the divided image as a center, is outputted as pixel data of reference pixels.

14. The medium according to claim 11, at said output step, among said memorized pixel data, pixel data of a pixel in a position closest to a pixel to be referred to is outputted as pixel data of the pixel to be referred to.

15. The medium according to claim 11, wherein at said output step, an average of pixel data of plural pixels corresponding to a predetermined region is outputted as pixel data of a pixel to be referred to.

16. A processing apparatus for processing input pixel data by referring to pixel data of peripheral pixels, comprising:

a division unit configured to divide an input image in a first direction;

an input unit configured to input pixel data of the divided image divided in the first direction in a second direction crossing said first direction at a right angle;

a memory configured to store the inputted pixel data;

an output unit configured to, when a pixel to be referred to for processing the stored pixel data is not included in the divided image, generating an address for reading a reference pixel from the memory based on a position of the divided image in the input image and outputting pixel data of the reference pixel based on the address; and a process unit configured to process the stored pixel data by referring to the pixel data of the reference pixel.

* * * * *